(12) United States Patent
Shah et al.

(10) Patent No.: US 8,801,410 B2
(45) Date of Patent: Aug. 12, 2014

(54) COUPLING SHAFT FOR GEAR PUMP

(75) Inventors: Satish Shantilal Shah, Rockford, IL (US); Timothy P. Walgren, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 388 days.

(21) Appl. No.: 13/035,004

(22) Filed: Feb. 25, 2011

(65) Prior Publication Data

US 2012/0219447 A1 Aug. 30, 2012

(51) Int. Cl.
*F04C 27/02* (2006.01)
*F04C 29/02* (2006.01)
*F04C 29/04* (2006.01)
*F03C 2/00* (2006.01)

(52) U.S. Cl.
USPC ............ 418/102; 418/1; 418/132; 418/206.1; 418/206.8; 464/182; 403/359.1; 403/359.6

(58) Field of Classification Search
USPC ........ 418/206.1–206.8, 102, 132, 1; 464/182; 403/359.1–359.6
See application file for complete search history.

(56) References Cited

U.S. PATENT DOCUMENTS

| | | | |
|---|---|---|---|
| 1,704,939 A * | 3/1929 | Grauel | 285/18 |
| 1,902,346 A | 3/1933 | Vogt | |
| 2,301,496 A | 11/1942 | Aldrich | |
| 2,756,684 A * | 7/1956 | Renzo | 418/102 |
| 3,018,641 A | 1/1962 | Carpigiani | |
| 3,045,778 A | 7/1962 | Mosbacher | |
| 3,182,596 A | 5/1965 | Prijatel | |
| 3,435,773 A | 4/1969 | Gustafsson | |
| 3,801,241 A * | 4/1974 | Martin et al. | 418/152 |
| 3,824,041 A | 7/1974 | Rystrom | |
| 3,833,317 A | 9/1974 | Rumsey | |
| 4,097,206 A | 6/1978 | Schonherr | |
| 4,290,739 A | 9/1981 | Korse | |
| 4,631,009 A | 12/1986 | Cygnor et al. | |
| 4,923,319 A * | 5/1990 | Dent | 403/2 |
| 5,004,407 A | 4/1991 | Hutchison | |
| 5,071,328 A | 12/1991 | Schlictig | |
| 5,586,875 A | 12/1996 | Ondrejko et al. | |
| 6,135,741 A * | 10/2000 | Oehman, Jr. | 418/102 |
| 6,138,646 A | 10/2000 | Hansen et al. | |
| 6,223,775 B1 | 5/2001 | Hansen et al. | |
| 6,241,498 B1 | 6/2001 | Hansen et al. | |
| 6,321,527 B1 | 11/2001 | Dyer et al. | |
| 6,705,847 B1 | 3/2004 | Sagawe et al. | |
| 7,094,042 B1 | 8/2006 | Borgetti et al. | |
| 7,878,781 B2 | 2/2011 | Elder | |
| 2002/0061256 A1 | 5/2002 | Hansen et al. | |
| 2006/0024188 A1 | 2/2006 | Muscarella et al. | |
| 2007/0178003 A1 | 8/2007 | Zhu et al. | |
| 2009/0148333 A1 | 6/2009 | Elder | |
| 2009/0159370 A1 * | 6/2009 | Maners et al. | 464/16 |

FOREIGN PATENT DOCUMENTS

GB 1037797 8/1966

* cited by examiner

*Primary Examiner* — Theresa Trieu
(74) *Attorney, Agent, or Firm* — Carlson, Gaskey & Olds, P.C.

(57) ABSTRACT

A coupling shaft assembly includes a coupling shaft with a first radial shoulder and a second radial shoulder, the first radial shoulder and the second radial shoulder each include at least one slot to provide a lubricant flow path.

18 Claims, 13 Drawing Sheets

COUPLING SHAFT FOR GEAR PUMP

BACKGROUND

The present disclosure relates to a pump, and more particularly to a fuel gear pump for gas turbine engines.

Fuel gear pumps are commonly used to provide fuel flow and pressure for gas turbine engines and other systems on aircrafts. The gear pump must perform over a wide system operating range and provide critical flows and pressures for various functions. Typically, these pumps receive rotational power from an accessory gearbox through a drive shaft.

In a dual gear stage pump rotational power is transferred from one gear stage to the other gear stage through an input shaft and coupling shaft. Each shaft usually has splines to transfer input shaft rotation into the respective gear stages. To minimize wear and meet all performance requirements throughout the pump service life, the splines may be lubricated during operation.

SUMMARY

A shaft assembly according to an exemplary aspect of the present disclosure includes a shaft with a first radial shoulder and a second radial shoulder, the first radial shoulder and the second radial shoulder each include at least one slot.

A gear pump according to an exemplary aspect of the present disclosure includes an input shaft which at least partially extends from the housing along an input shaft axis, the input shaft defines a first radial shoulder and a second radial shoulder. A coupling shaft is located along a coupling shaft axis parallel to the input shaft axis, the coupling shaft defines a first radial shoulder and a second radial shoulder, the first radial shoulder and the second radial shoulder each include at least one slot.

A method of lubricating a shaft within a housing according to an exemplary aspect of the present disclosure includes communicating a lubricant from a first gear stage along a first splined end section and through a slot in a first radial shoulder of the shaft.

A method of mounting a shaft within a housing according to an exemplary aspect of the present disclosure includes mounting a shaft into a first gear stage, a lubricant communicatable from the first gear stage along a first splined end section and through a slot in a first radial shoulder of the shaft.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 12 is an end view of a retainer plate of the input shaft assembly;

DETAILED DESCRIPTION

Figure 1:
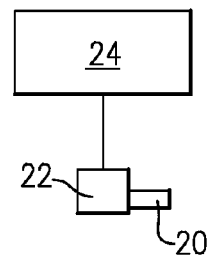
FIG. 1 is a block diagram of a gear pump driven by an accessory gearbox to communicate a fluid such as fuel to a gas turbine.

FIG. 1 schematically illustrates a gear pump 20 driven by an accessory gearbox 22 to communicate a fluid such as fuel to a gas turbine 24. It should be appreciated that the present application is not limited to use in conjunction with a specific system. Thus, although the present application is, for convenience of explanation, depicted and described as being implemented in an aircraft fuel pump, it should be appreciated that it can be implemented in numerous other systems. In addition, although a dual stage gear pump is disclosed, other machines with a shaft will also benefit herefrom.

Figure 2:
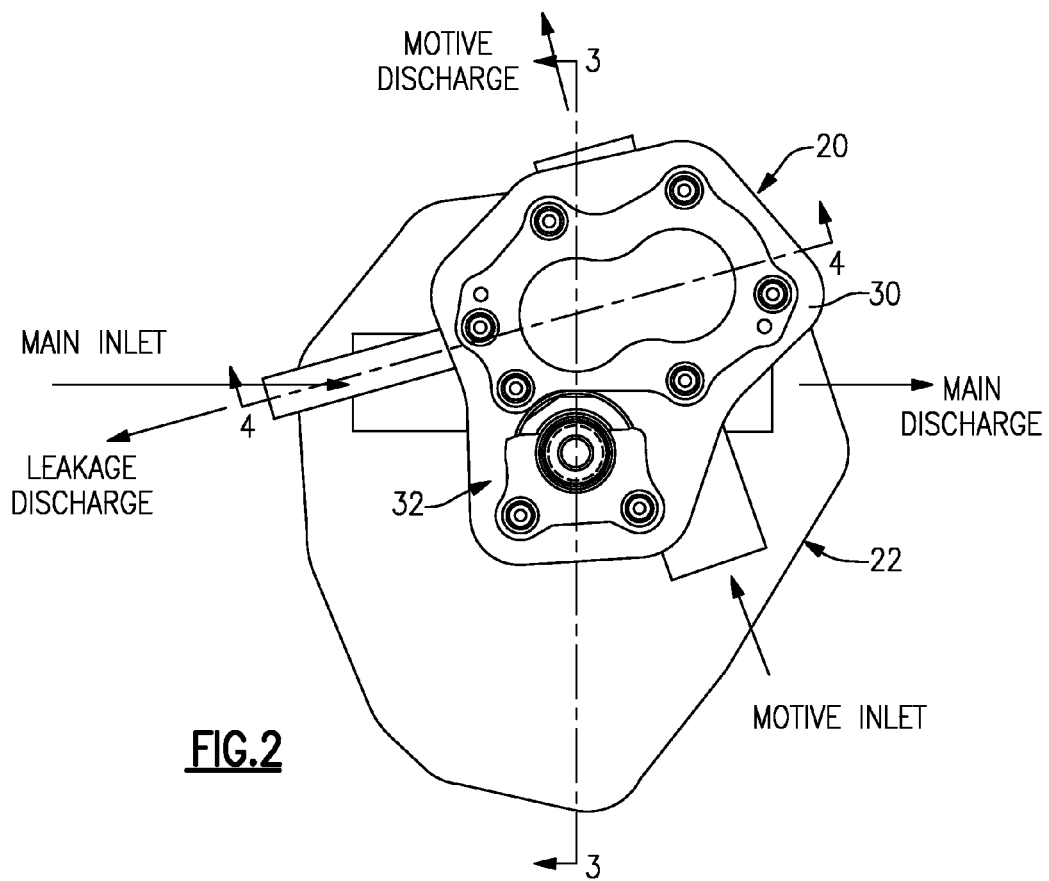
FIG. 2 is an end view of a gear pump.
Figure 3:
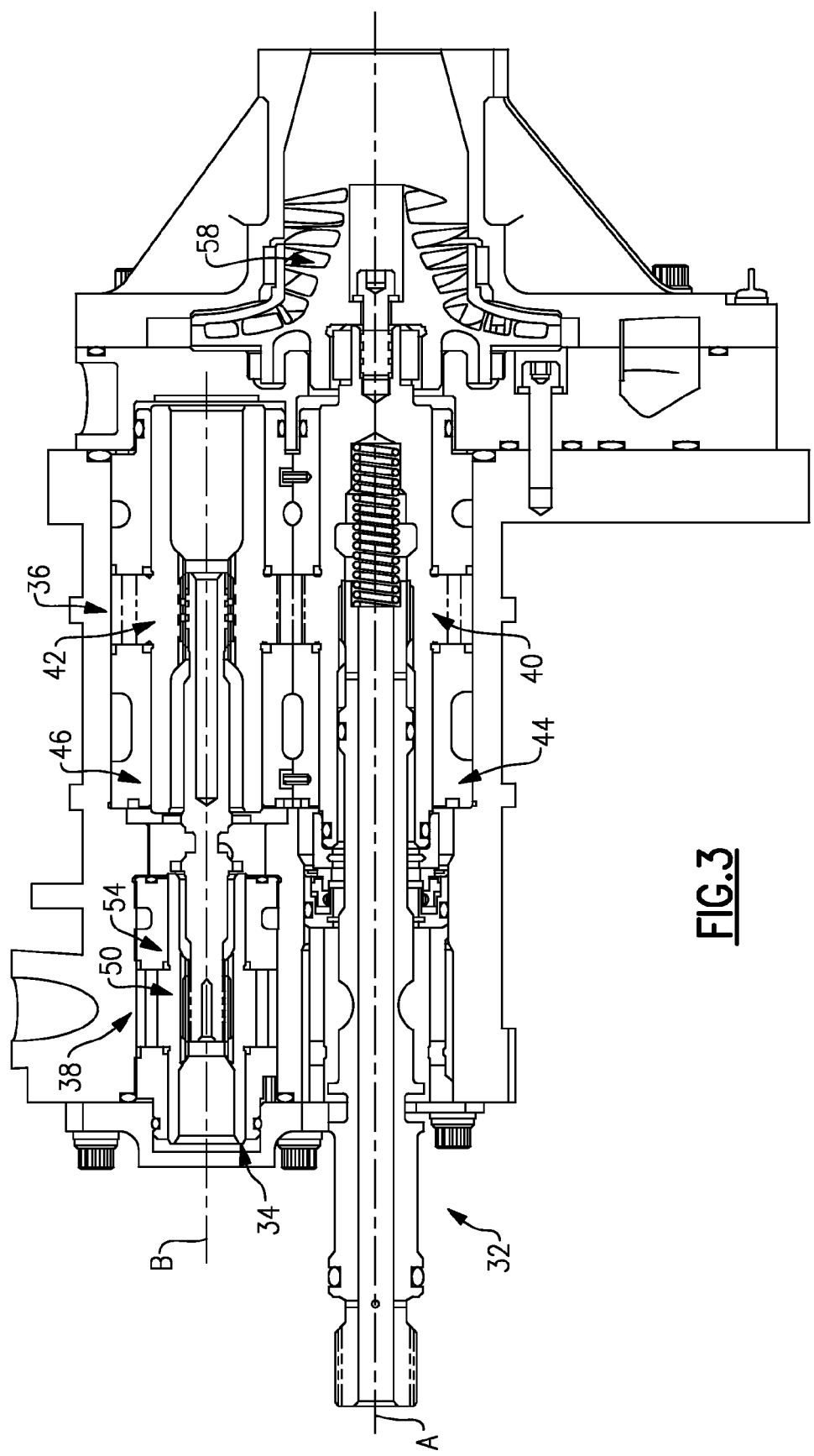
FIG. 3 is a sectional view of the gear pump taken along line 3-3 in FIG. 2.
Figure 4:
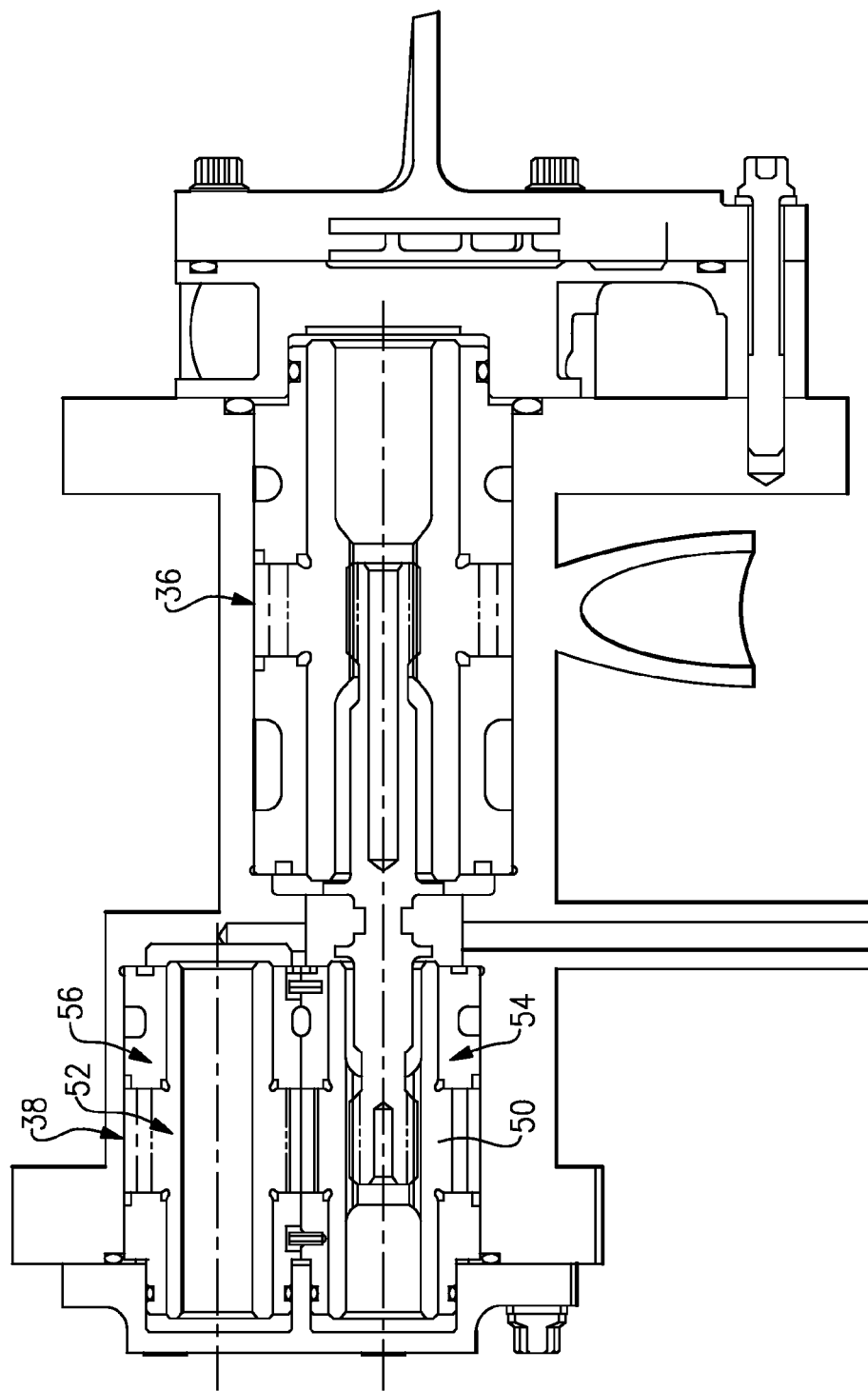
FIG. 4 is a sectional view of the gear pump taken along line 4-4 in FIG. 2.

With reference to FIG. 2, the gear pump 20 generally includes a housing 30 that includes an input shaft assembly 32 and a coupling shaft assembly 34 to power a main stage 36 and a motive stage 38 (FIGS. 3 and 4). Rotational power is transferred from the gas turbine 24 to the accessory gearbox 22 then to the gear pump 20 through the input shaft assembly 32. In the disclosed, non-limiting embodiment, the input shaft assembly 32 interfaces with the accessory gearbox 22 and receives a lubricant therefrom while the coupling shaft assembly 34 is lubricated with fuel.

With reference to FIG. 3, the input shaft assembly 32 is defined along an input axis A and the coupling shaft assembly 34 is defined along a coupling axis B parallel to the input axis A. The main stage 36 generally includes a main drive gear 40, a main driven gear 42, a main drive bearing 44 and a main driven bearing 46. The motive stage 38 generally includes a motive drive gear 50, a motive driven gear 52, a motive drive bearing 54 and a motive driven bearing 56 (FIG. 4).

Figure 5:
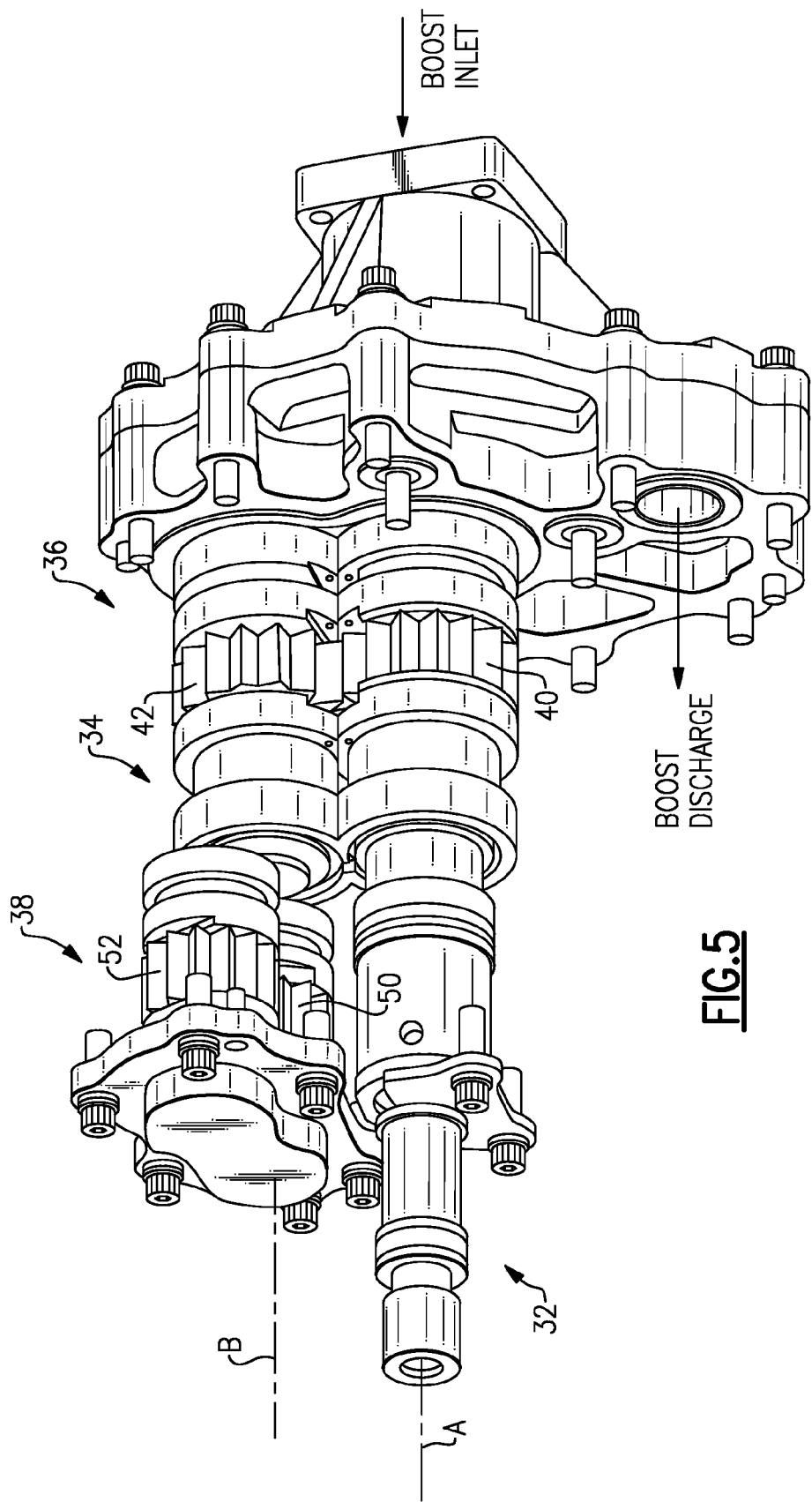
FIG. 5 is a perspective view of the gear pump with the housing removed.
Figure 6:
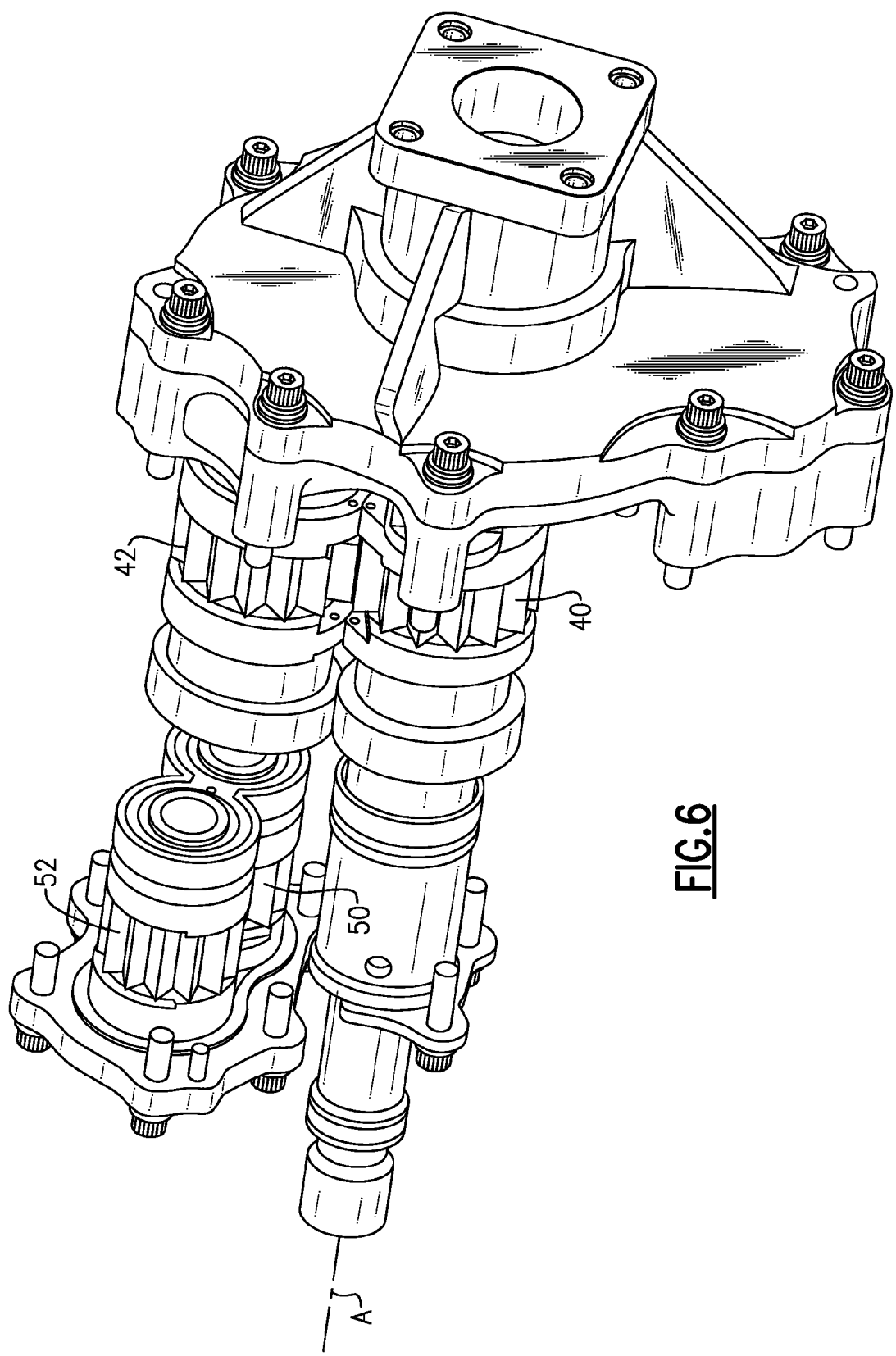
FIG. 6 is another perspective view of the gear pump with the housing removed.
Figure 7:
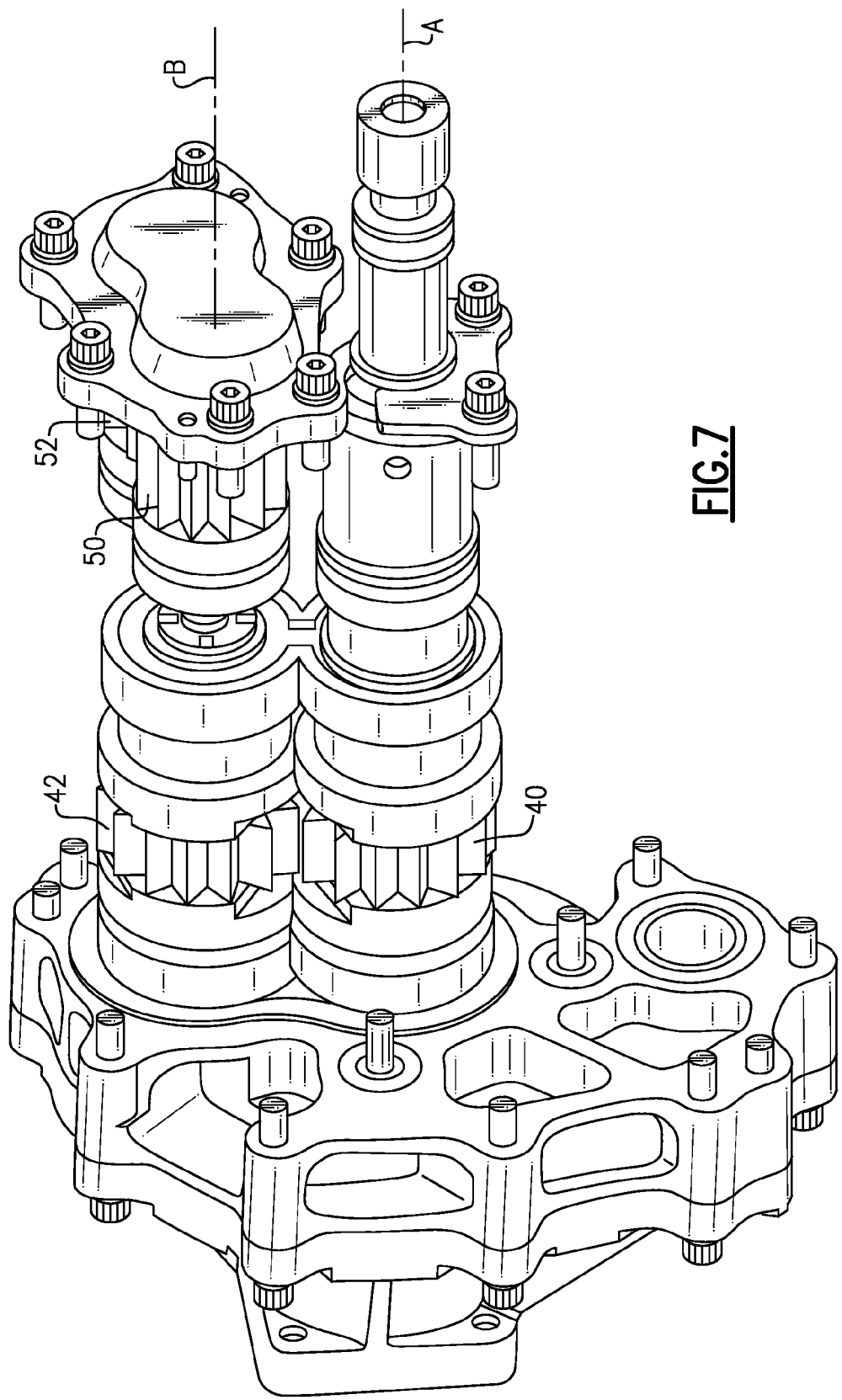
FIG. 7 is another perspective view of the gear pump with the housing removed.

The main drive gear 40 is in meshed engagement with the main driven gear 42 and the motive drive gear 50 is in meshed engagement with the motive driven gear 52 (FIGS. 5-7). The input shaft assembly 32 drives the coupling shaft assembly 34 through the main stage 36 to drive the motive stage 38. A boost stage 58 is also driven by the input shaft assembly 32 to define a centrifugal pump with an impeller and integrated inducer.

Figure 8:
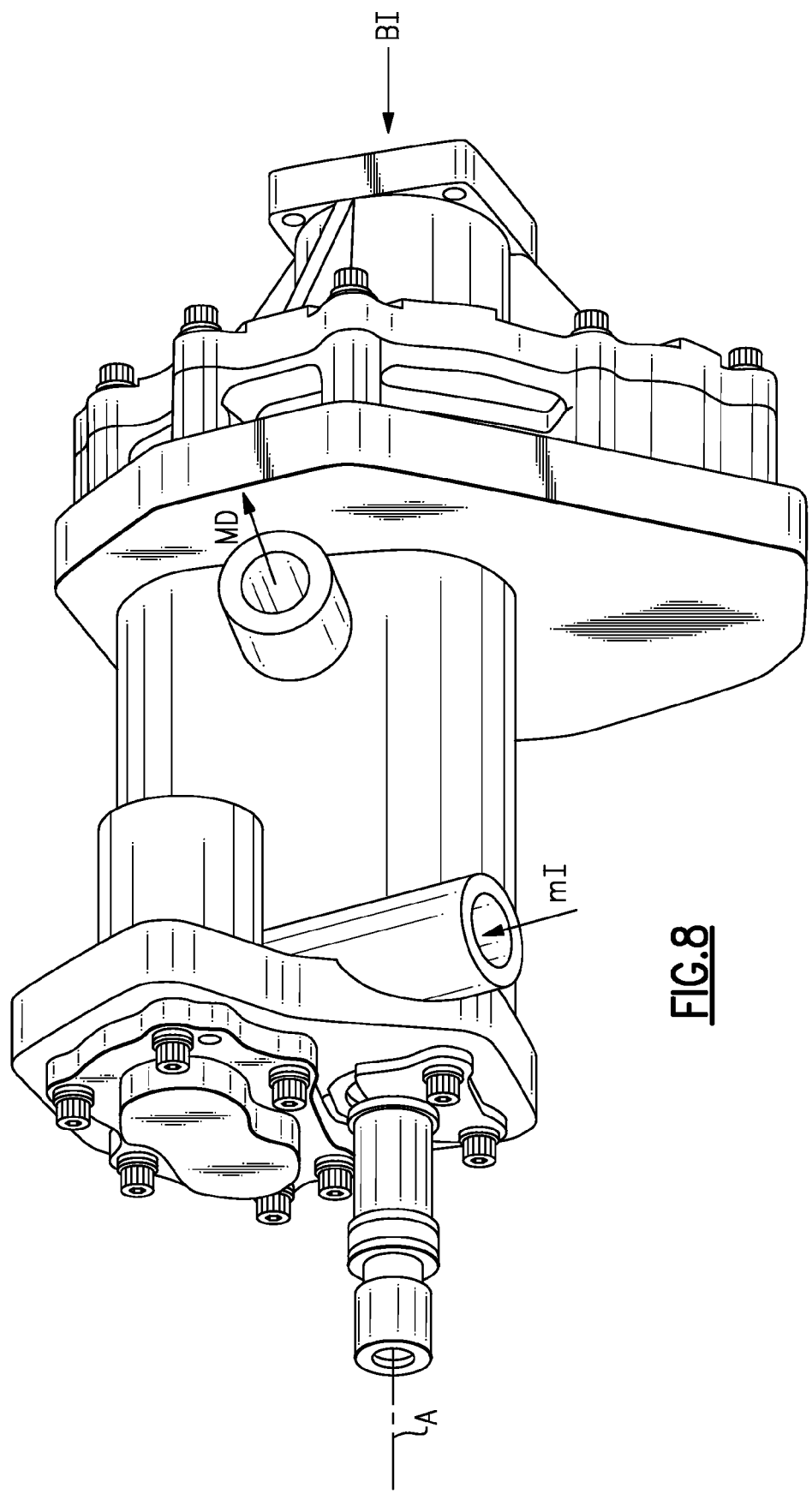
FIG. 8 is a perspective view of the gear pump from the same perspective as in FIG. 5.
Figure 9:
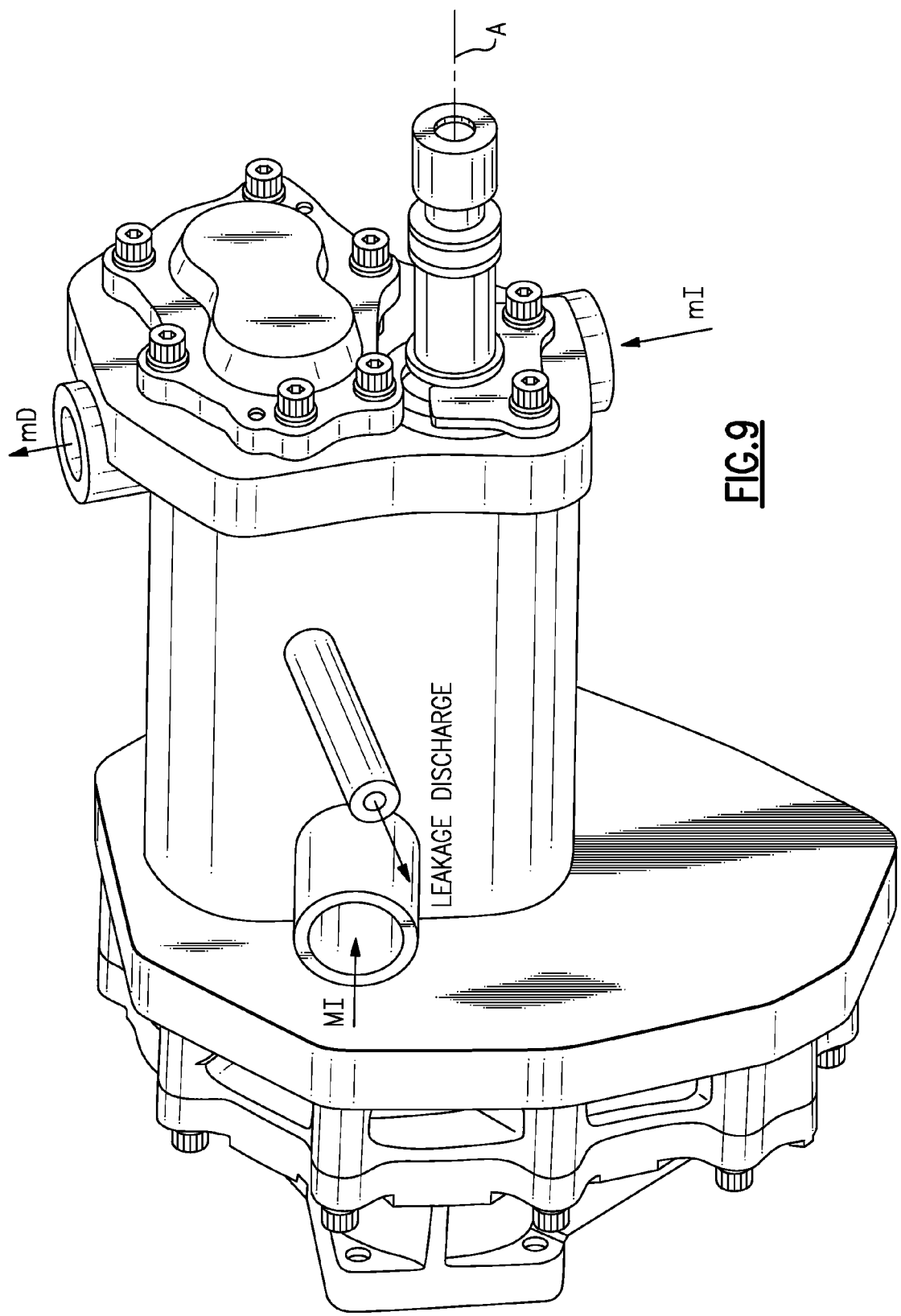
FIG. 9 is a perspective view of the gear pump from the same perspective as in FIG. 7.
Figure 10:
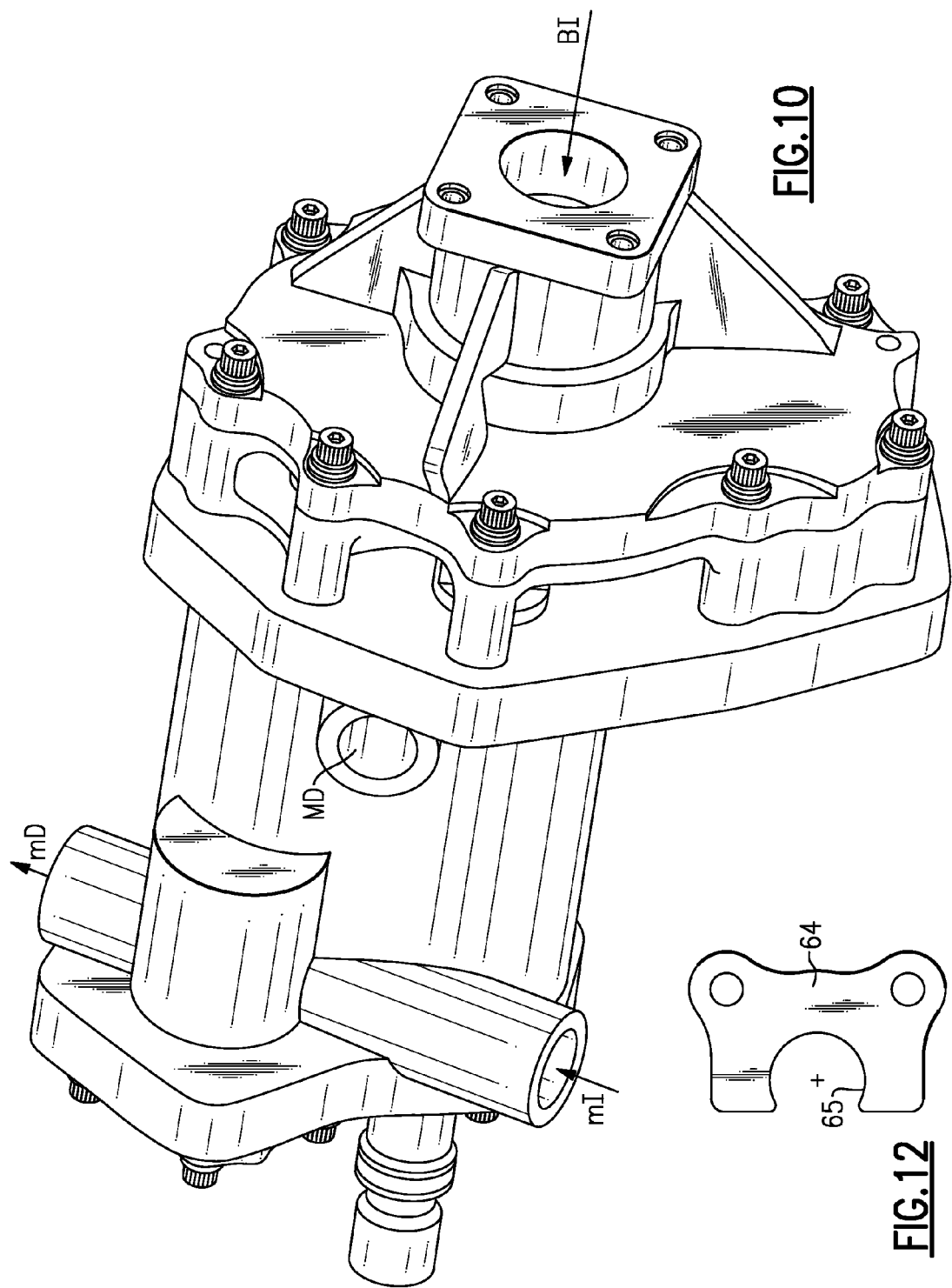
FIG. 10 is a perspective view of the gear pump from the same perspective as in FIG. 6.

The stages 36, 38, 58 work mostly independently. Each stage 36, 38, 58 includes a separate inlet and discharge (FIGS. 8-10). As the meshed gears 40, 42 and 50, 52 rotate, respective volumes of fluid are communicated from the main stage inlet MI to the main stage discharge MD and from a motive stage inlet mI to a motive stage discharge mD such that the main stage 36 communicates a main fuel flow while the motive stage 38 supplies a motive fuel flow. The main stage inlet MI and main stage discharge MD as well as the motive stage inlet mI and motive stage discharge mD are respectively directed along generally linear paths through the respective gear stage 36, 38.

In the disclosed non-limiting embodiment, an aircraft fuel system provides flow and pressure to the boost stage inlet BI. A portion of the boost stage discharge is routed internally to the motive stage inlet mI. The remainder of the boost stage discharge is discharged from the gear pump 20 to the aircraft fuel system, then returns to the main stage inlet MI. The motive stage discharge mD is communicated to the aircraft fuel system. The main stage discharge MD is also communicated to the aircraft fuel system to provide at least two main functions: actuation and engine burn flow. There may be alternative or additional relatively minor flow directions and functions, but detailed description thereof need not be further disclosed herein.

Figure 11:
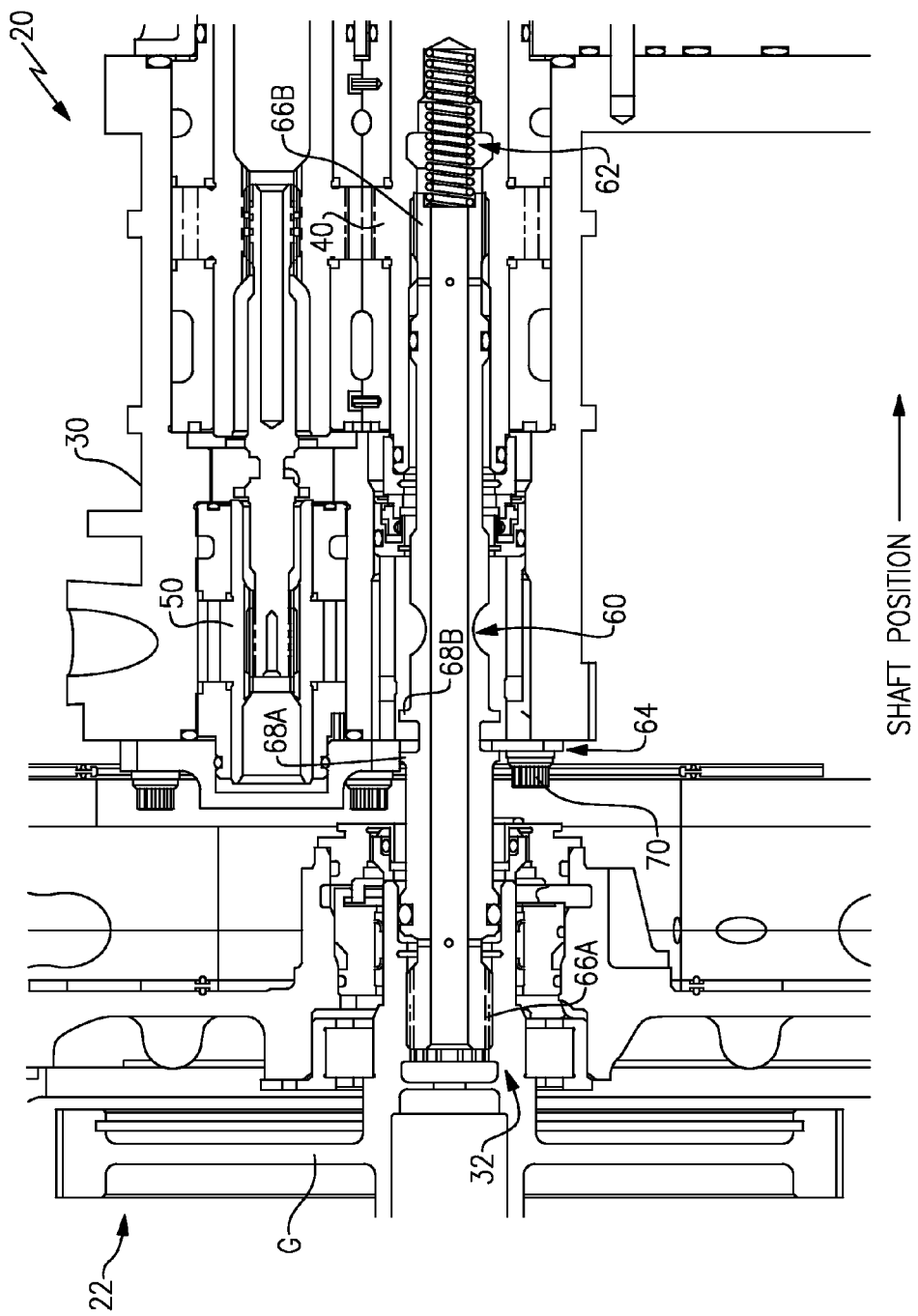
FIG. 11 is an expanded sectional view of an input shaft assembly of the gear pump.

With reference to FIG. 11, the input shaft assembly 32 includes an input shaft 60, a spring 62 and a retainer plate 64. The input shaft 60 is a hollow shaft with splined end sections 66A, 66B and radial shoulders 68A, 68B therebetween. The splined end section 66A plugs into a gear G of the accessory gearbox 22. The splined end section 66B interfaces with the main drive gear 40.

The radial shoulders 68A, 68B are generally aligned with the housing 30 to receive the retainer plate 64 therebetween. The retainer plate 64 is attached to the housing 30 through fasteners 70 such as bolts (also illustrated in FIG. 2) to position an interrupted opening 65 between the radial shoulders 68A, 68B. The interrupted opening 65 in one disclosed non-limiting embodiment is an arcuate surface with an interruption less than 180 degrees (FIG. 12). The axial position of the input shaft 60 is thereby axially constrained by the interaction of the radial shoulders 68A, 68B and to the retainer plate 64.

Figure 13:
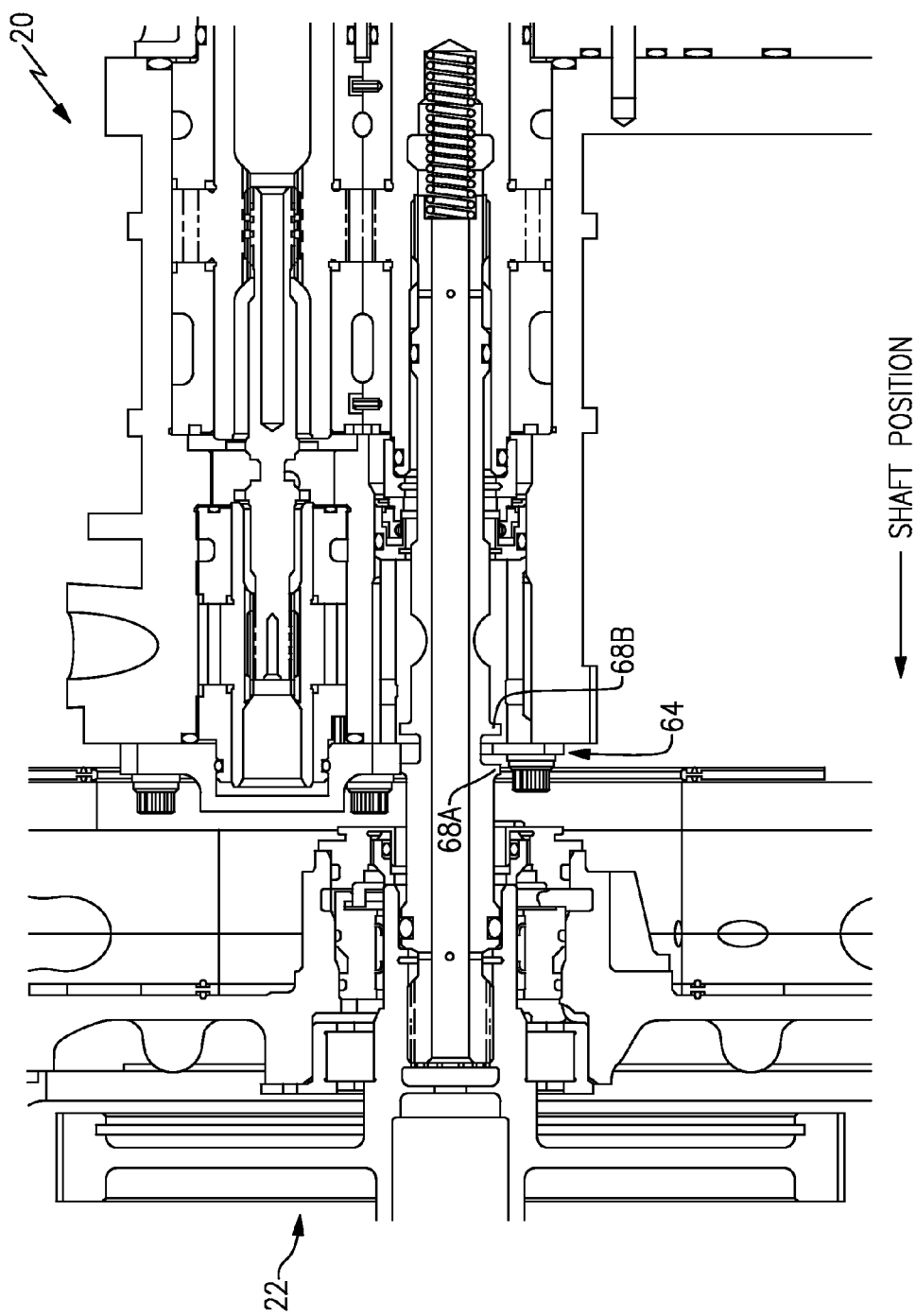
FIG. 13 is an expanded sectional view of an input shaft assembly of the gear pump in an operational position.

With reference to FIG. 13, the spring 62 biases the input shaft assembly 32 to position the input shaft assembly 32 during gear pump operation. That is, the spring 62 allows the input shaft assembly 32 to move in the housing 30 in response to impact loads, until the input shaft assembly 32 bottoms out on the retainer plate 64, but during operation, the spring 62 positions the input shaft assembly 32 such that the radial shoulders 68A, 68B are spaced from the retainer plate 64. This assures there are no rotational to stationary part contact during operation.

Figure 14:
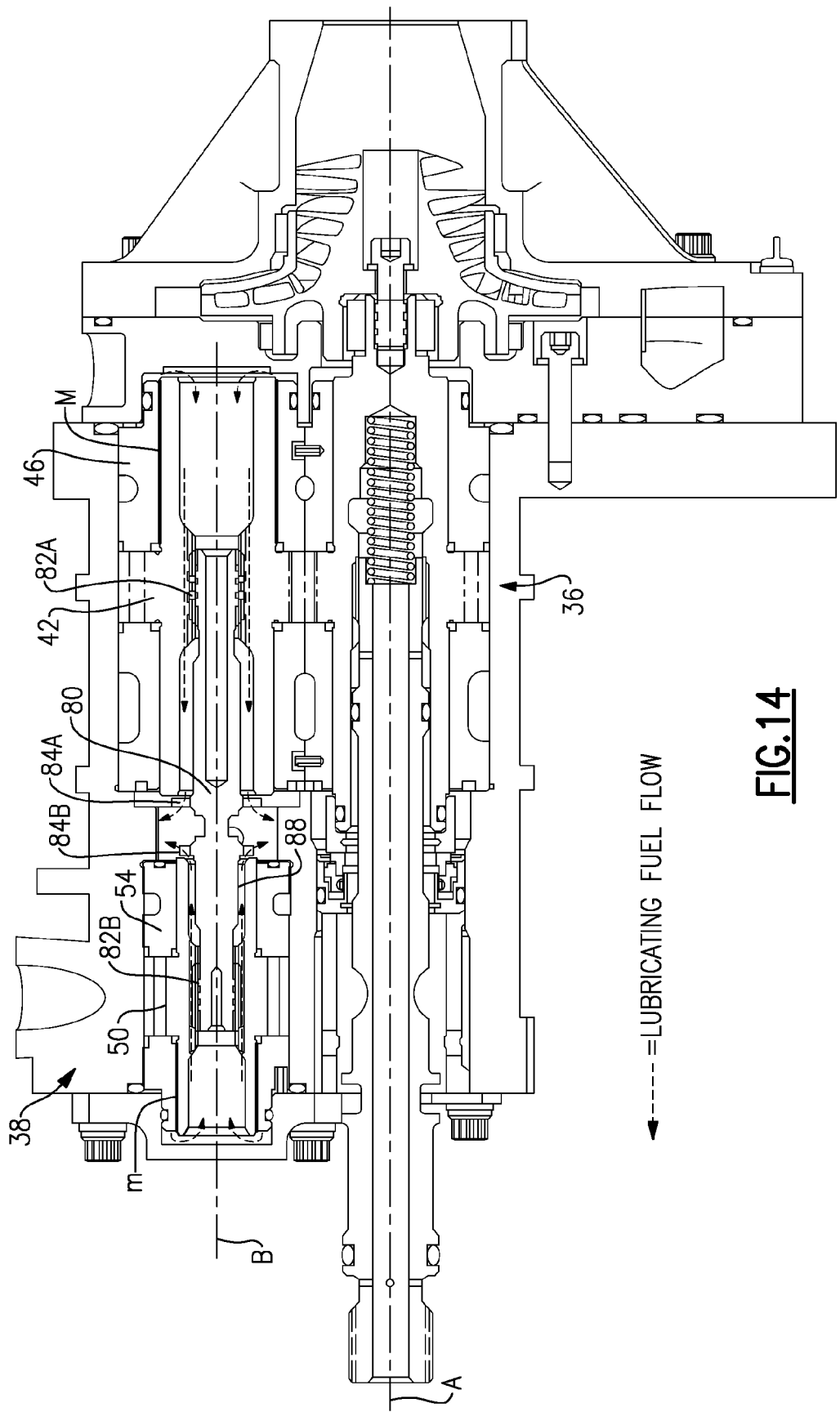
FIG. 14 is a sectional view of the gear pump illustrating a coupling shaft assembly lubricant flow path.

With reference to FIG. 14, the coupling shaft assembly 34 includes a coupling shaft 80 with splined end sections 82A, 82B and radial shoulders 84A, 84B therebetween. The splined end section 82A plugs into the main driven gear 42 and the splined end section 82B plugs into the motive drive gear 50 each of which include corresponding inner diameter splined interfaces. The radial shoulders 84A, 84B position the coupling shaft 80 between the main stage 36 and the motive stage 38 which ensures both splined end sections 82A, 82B maintain full spline engagement with the respective gears 42, 50.

The splined end sections 82A, 82B need to be properly lubricated during operation to minimize wear and meet all performance requirements throughout service life. In addition, a lubrication path is provided to ensure lubricant does not become trapped and increase pressure. Using fluid, proper lubrication involves continually supplying, draining, and replenishing the fluid at the spline interfaces 82A, 82B.

In the disclosed, non-limiting embodiment, fuel lubrication which originates (illustrated schematically at M) from the main stage 36 and originates (illustrated schematically at m) from the motive stage 38 is communicated along the splined end sections 82A, 82B then discharged from between the radial shoulders 84A, 84B. That is, fuel leakage from the journal diameters defined between the main driven gear 42 and the main driven bearing 46 as well as from the motive drive gear 50 and the motive drive bearing 54 is communicated to the ends of the coupling shaft 80 for use as lubricant.

To facilitate use of the gear stage 36, 38 fuel leakage for lubrication, the coupling shaft inner diameter is solid at least between the radial shoulders 84A, 84B and sets of slots 86 (FIGS. 15 and 16) are defined in the radial shoulders 84A, 84B. Since the coupling shaft inner diameter is solid, fuel lubricant is communicated over the splined end sections 82A, 82B. The slots 86 allow the fuel lubricant to exit a coupling shaft bore 88 and be collected within the housing 30 then directed back into the system.

Figure 15:
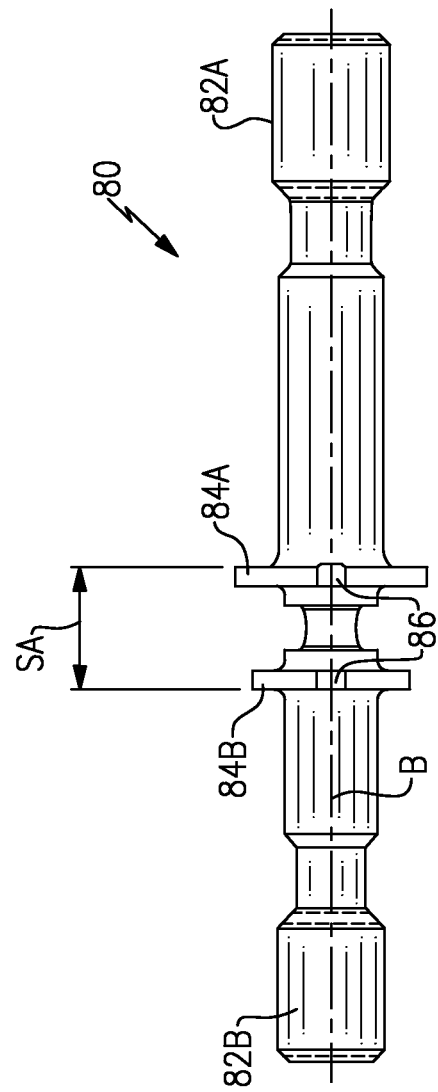
FIG. 15 is a side view of the coupling shaft.
Figure 16:
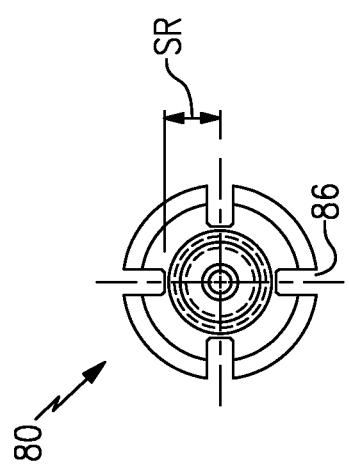
FIG. 16 is an end view of the coupling shaft.

With reference to FIG. 15, the separation between the radial shoulders 84A, 84B defines an axial distance SA along the axis of rotation B and each of the slots 86 defines a lowermost radial dimension SR (FIG. 16) from the axis of rotation B. It should be understood that the lowermost radial dimension SR is independent of the radial shoulders 84A, 84B outer diameter in that each radial shoulder 84A, 84B may have an equivalent outer diameter or each may have a different outer diameter as illustrated.

The axial dimension SA in one disclosed non-limiting dimensional embodiment is 0.478-0.678 inches (12.1-17.2 mm) with a nominal dimension of 0.578 inches (14.7 mm). The radial dimension SR in this disclosed non-limiting dimensional embodiment is 0.170-0.370 inches (4.3-9.4 mm) with a nominal dimension of 0.27 inches (6.9 mm). In this disclosed non-limiting dimensional embodiment, a ratio of SR/SA is defined between 0.25-0.77. The disclosed ratios permit the slots 86 to continually drain and replenish the lubricant to assure proper spline lubrication as well as provide a continuous path so that the lubricant does not become trapped and build up pressure within the gear pump 20.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gear pump comprising:
   a housing;
   an input shaft which at least partially extends from said housing and rotatable about an input shaft axis, said input shaft defines a first input shaft radial shoulder and a second input shaft radial shoulder; and
   a coupling shaft rotatable about a coupling shaft axis parallel to said input shaft axis, said coupling shaft defines a first coupling shaft radial shoulder and a second coupling shaft radial shoulder, said first coupling shaft radial shoulder and said second coupling shaft radial shoulder each include at least one slot that opens, respectively, at opposed axial sides of the first coupling shaft radial shoulder and opposed axial sides of the second coupling shaft radial shoulder.

2. The gear pump as recited in claim 1, wherein said coupling shaft includes a first splined end section and a second splined end section, and said first coupling shaft radial shoulder and said second coupling shaft radial shoulder are both located between said first splined end section and said second splined end section.

3. The gear pump as recited in claim 1, further comprising a drive gear mounted to said input shaft and a driven gear mounted to said coupling shaft, said drive gear in meshed engagement with said driven gear.

4. The gear pump as recited in claim 1, wherein said coupling shaft is solid at least between said first coupling shaft radial shoulder and said second coupling shaft radial shoulder along said coupling shaft axis.

5. The gear pump as recited in claim 1, wherein said coupling shaft includes a first splined end section and a second splined end section, and said first coupling shaft radial shoulder and said second coupling shaft radial shoulder are both located between said first splined end section and said second splined end section, with radial spaces between said coupling shaft and a bore in which said coupling shaft extends, said radial spaces extending, respectively, from said first splined end section to said first coupling shaft radial shoulder and from said second splined end section to said second coupling shaft radial shoulder.

6. The gear pump as recited in claim 1, wherein an axial separation between said first coupling shaft radial shoulder and said second coupling shaft radial shoulder defines an axial distance SA along an axis of rotation, said at least one slot defines a lowermost radial dimension SR from the axis of rotation, a ratio of SR/SA defined between 0.25-0.77.

7. The gear pump as recited in claim 1, wherein said first coupling shaft radial shoulder and said second coupling shaft radial shoulder each include a respective connected base and a respective free end radially outwards of said connected base with respect to said coupling shaft axis.

8. The gear pump as recited in claim 1, further comprising a drive gear mounted on said input shaft for rotation therewith and a driven gear mounted on said coupling shaft for rotation therewith and in meshed engagement with said drive gear such that rotation of said input shaft causes rotation of said coupling shaft though said meshed engagement, said drive gear and said driven gear being operable to move a fluid from an inlet to a discharge, and said first coupling shaft radial shoulder is located axially between said second coupling shaft radial shoulder and said driven gear.

9. The gear pump as recited in claim 8, further comprising a motive drive gear mounted on said coupling shaft for rotation therewith, and said second coupling shaft radial shoulder is located axially between said first coupling shaft radial shoulder and said motive drive gear.

10. The gear pump as recited in claim 1, wherein said input shaft and said coupling shaft extend in said housing, with a drive gear mounted on said input shaft and a driven gear mounted on said coupling shaft in meshed engagement with said drive gear such that rotation of said input shaft causes rotation of said coupling shaft though said meshed engagement, said drive gear and said driven gear being operable to move a fluid from an inlet to a discharge.

11. The gear pump as recited in claim 1, wherein said at least one slot of each of said first coupling shaft radial shoulder and said second coupling shaft radial shoulder extends through, and opens to, first and second axial faces of each of said first coupling shaft radial shoulder and said second coupling shaft radial shoulder and opens to a radially outer periphery of each of said first coupling shaft radial shoulder and said second coupling shaft radial shoulder.

12. A gear pump comprising:
a housing;
an input shaft which at least partially extends from said housing along an input shaft axis, said input shaft defines a first input shaft radial shoulder and a second input shaft radial shoulder; and
a coupling shaft along a coupling shaft axis parallel to said input shaft axis, said coupling shaft defines a first coupling shaft radial shoulder and a second coupling shaft radial shoulder, said first coupling shaft radial shoulder and said second coupling shaft radial shoulder each include at least one slot, wherein said at least one slot includes four slots each equally displaced about a periphery of said first coupling shaft radial shoulder and said second coupling shaft radial shoulder, wherein said input shaft and said coupling shaft extend in said housing, with a drive gear mounted on said input shaft and a driven gear mounted on said coupling shaft in meshed engagement with said drive gear such that rotation of said input shaft causes rotation of said coupling shaft though said meshed engagement, said drive gear and said driven gear being operable to move a fluid from an inlet to a discharge.

13. A gear pump comprising:
a housing;
an input shaft which at least partially extends from said housing along an input shaft axis, said input shaft defines a first input shaft radial shoulder and a second input shaft radial shoulder; and
a coupling shaft along a coupling shaft axis parallel to said input shaft axis, said coupling shaft defines a first coupling shaft radial shoulder and a second coupling shaft radial shoulder, said first coupling shaft radial shoulder and said second coupling shaft radial shoulder each include at least one slot, wherein an axial separation between said first coupling shaft radial shoulder and said second coupling shaft radial shoulder defines an axial distance SA along an axis of rotation, said at least one slot defines a lowermost radial dimension SR from the axis of rotation, a ratio of SR/SA defined between 0.25-0.77, and said at least one slot includes four slots each equally displaced about a periphery of said first coupling shaft radial shoulder and said second coupling shaft radial shoulder, each of said slots defines said lowermost radial dimension SR, wherein said input shaft and said coupling shaft extend in said housing, with a drive gear mounted on said input shaft and a driven gear mounted on said coupling shaft in meshed engagement with said drive gear such that rotation of said input shaft causes rotation of said coupling shaft though said meshed engagement, said drive gear and said driven gear being operable to move a fluid from an inlet to a discharge.

14. The gear pump as recited in claim 13, wherein said first coupling shaft radial shoulder and said second coupling shaft radial shoulder define a different outer diameter dimension.

15. A method of installing a shaft within a housing comprising:
mounting a shaft which is rotatable about a shaft axis into a first gear stage, a lubricant communicatable from the first gear stage along a first splined end section and through a slot in a first radial shoulder of the shaft.

16. A method as recited in claim 15, further comprising:
communicating the lubricant from a second gear stage along a second splined end section and through a slot in a second radial shoulder of the shaft, the second radial shoulder axially displaced from the first radial shoulder an axial distance SA along an axis of rotation, each of said slots define a lowermost radial dimension SR from the axis of rotation, a ratio of SR/SA defined between 0.25-0.77.

17. A method as recited in claim 15, further comprising:
mounting the shaft along an axis parallel to an input axis about which an input shaft rotates, the input shaft in meshed engagement with the shaft through the first gear stage.

18. A method as recited in claim 15, further comprising communicating the lubricant through a slot in a radial shoulder of the shaft, the slot opening at opposed axial sides of the radial shoulder.

* * * * *